Patented Oct. 10, 1939

2,176,031

UNITED STATES PATENT OFFICE 2,176,031

RETARDING RANCIDITY IN GLYCERIDE OILS

Sidney Musher, New York, N. Y., assignor to Musher Foundation Incorporated, New York, N. Y., a corporation of New York No Drawing. Application April 1, 1939, Serial No. 265,539

8 Claims. (Cl. 99—163)

This invention relates to the treatment of glyceride oils with anti-oxygenic materials in order to retard oxidative deterioration thereof.

In accordance with this invention, finely divided roasted de-fatted cacao residue is added to and thoroughly dispersed in the glyceride oil subject to rancidity.

This cacao residue contains less than 30% fat and is not oily in character, most of the oil having been removed during the expressing operation.

Example I

Cacao nibs containing about 50% fat were roasted for 55 minutes in a revolving drum roaster. The roasted nibs were then ground into paste form and expressed in an hydraulic press until the residue contained about 24% fat. The de-fatted residue was then pulverized to 50 mesh. 1% of the cacao residue thus obtained was added to and thoroughly admixed in freshly rendered lard. The lard thus obtained was tested against untreated lard by holding at 208° F. with air being bubbled through the sample until rancidity was observed and determined both organoleptically and by peroxide values.

Rancid after—
Untreated lard _____ 3 hours
Treated lard _____ 7½ hours

Among the glyceride oils that may be treated in accordance with this invention are animal and vegetable fats and oils including cottonseed oil, corn oil, sesame oil, peanut oil, soya bean oil, cocoanut oil, olive oil, palm kernel oil, tea seed oil, lard, tallow, cod liver oil, halibut liver oil, mackerel oil, menhaden oil, herring oil and similar oils, whether crude or refined, and partially or fully hydrogenated.

The finely divided roasted de-fatted residue to be employed may be added in any desired proportion but preferably less than 10% and desirably less than 5%. Particularly where little or no change in flavor is desired, as little as 0.5% may be used and in some cases even this proportion may be reduced to using as little as 0.05%.

Following the addition of the finely divided roasted de-fatted cacao residue, where desired, the insoluble portion may be filtered from the oil. The filtration should take place following, preferably, a short treatment at a slightly elevated temperature such as at 150° F. to 175° F. for about 15 minutes.

Example II

To refined and deodorized cottonseed oil was added and thoroughly mixed therein 0.5% by weight of 70 mesh finely divided roasted de-fatted cacao residue. The residue was mixed in the oil for 30 minutes at 160° F. following which the oil containing the residue was filtered and the filtered oil was tested on the stability apparatus as in Example I.

Rancid after—
Untreated oil _____ 15 hours
Treated oil _____ 22 hours

Other substantially fat free cacao residues may similarly be employed although finely divided roasted de-fatted cacao residue is the most desirable. The most preferred of the other substantially fat free cacao residues is cacao shells or skins that may be finely divided and used in an analogous manner. Among the other cacao products are the cacao nibs, roasted and unroasted, which should preferably be finely divided or thoroughly macerated in order for the entire product to be thoroughly distributed and dispersed in the entire oil that is being treated.

Example III

To soya bean oil was added 0.1% by weight of finely milled roasted ground cacao nibs prepared by roasting the cacao nibs for 45 minutes in a rotary drum roaster, grinding and macerating at 150° F. to produce a paste and then adding such paste to the oil. The oil was tested on the stability apparatus as in Example I.

Rancid after—
Untreated oil _____ 7 hours
Treated oil _____ 12 hours

Solvent extracts of finely divided roasted de-fatted cacao residue may similarly be employed and particularly the water and alcohol soluble extracts such as those obtained using a solvent having the formula XOH where X is either hydrogen or a low molecular weight aliphatic radical, such as methyl alcohol, ethyl alcohol, etc.

In the preparation of such extracts, the solvent such as water is mixed with the finely divided roasted de-fatted cacao residue, for example, using about 1 pound of the residue to approximately 10 pounds by weight of the solvent such as water, thoroughly admixing at about 135° F. for 30 minutes, then allowing to stand for approximately 4 hours at 100° F., removing the supernatant water portion containing the water soluble materials and evaporating and concentrating in a stainless steel vacuum pan or subjecting to other similar drying operation such as by spray drying, drum drying, etc., so that a concentrated antioxygenic material is obtained.

Where desired, a carrier may be employed for the concentrated water or alcoholic extract such as by the use of powdered skim milk, salt, sugar, starch, flour or calcium phosphate. Where skim milk is employed as a carrier, for instance, condensed skim milk may be mixed with a partially condensed extract so that a thoroughly combined product is obtained, and then such mixture of the extract and the condensed skim milk is subjected to a drying operation such as drum drying, spray drying or similar drying procedure.

Under these circumstances a very highly active antioxygenic material is obtained which may be utilized for addition to organic compositions subject to oxidation such as to compositions containing glyceride oils, essential oils and hydrocarbon oils in a relatively small proportion such as in an amount of less than 2% and desirably less than 0.5%.

Where cacao shells are employed for extraction, said cacao shells should first be finely divided or macerated in order for the maximum surface exposure to be obtained in the preparation of such extract.

In the case of the use of finely divided roasted de-fatted cacao residue or its extracts, it is highly desirable for the oil that is treated to be heated after the addition of the cacao material thereto and dispersal therein to a high temperature such as to in excess of 250° F. and preferably to about between 350° F. and 400° F. for a short period of time such as from 15 seconds to 30 minutes in order for very marked antioxidative activity to be developed.

It is not known exactly how this interaction occurs, but some chemical action apparently takes place whereby there is an interaction between the cacao material and the oil when the residue is burnt or charred in the oil at the temperature of about 400° F. and obtaining a markedly increased stabilizing action.

*Example IV*

To cod liver oil was added 1% of 50 mesh finely divided roasted de-fatted cacoa residue and tested as in Example I.

Rancid after—
Cod liver oil, no addition_____ 2 hours
Cod liver oil containing 1% residue____ 5 hours
Cod liver oil containing 1% residue heated to 400° F. for 10 minutes and then tested_____ 26 hours

*Example V*

The water extract of finely divded de-fatted cacao residue was prepared by mixing the residue with 9 parts by weight of water at 135° F. for 30 minutes, allowing the mixture to stand for 5 hours until the undissolved fibre portion settled out, siphoning the supernatant water soluble portion, evaporating that supernatant portion in a vacuum pan under 25 inches of vacuum at 135° F. to obtain a concentrated extract having 70% total solids and then drying the extract in a vacuum oven at 150° F.

The extract thus obtained was added to cod liver oil and tested as in Example I.

Rancid after—
Cod liver oil, no addition_____ 2 hours
Cod liver oil containing 0.5% concentrated water extract_____ 3¼ hours
Cod liver oil containing 0.5% concentrated water extract heated in the oil to 400° F. for 10 minutes_____ 14 hours

*Example VI*

The water extract of finely divided cacao residue obtained as in Example V was redissolved in 4 parts by weight of water and sprayed on hot coffee beans after such beans had been roasted in a laboratory roaster for 10 minutes and while the beans were at approximately 500° F. Approximately 8% by weight of water containing the concentrated water extract was sprayed on the coffee. This quenching operation immediately cooled the beans to a temperature of about 230° F. The coffee beans were then further cooled by blowing air through them and ground. The coffee thus obtained was found to be markedly resistant to oxidative deterioration and to the loss of its fresh flavor and aroma.

Following the addition of these cacao materials to the oils, such oils may be deodorized, hydrogenated or otherwise treated and the antioxidant action will remain to a substantial degree. The stabilizing materials may be added as part of the deodorizing or hydrogenation operation whereby in the course of the high heat applied during deodorization or hydrogenation marked stabilizing activity will be obtained.

The finely divided roasted de-fatted cacao residue described herein may also be employed for addition to organic compositions containing oxidizable oils or other oxidizable materials. The water extract of the cacao materials is particularly desirable for use in connection with aqueous compositions subject to oxidation such as for addition to milk, cream, orange juice, egg yolk and similar products. The other extracts such as the alcoholic extract are particularly desirable for addition to substantially oily compositions.

Having described my invention, what I claim is:

1. A food glyceride oil subject to oxidative deterioration having thoroughly incorporated therein and distributed therewith a relatively small proportion, less than 5%, of a finely divided de-fatted cacao residue.

2. A glyceride oil subject to oxidative deterioration having incorporated therein a relatively small proportion of a finely divided roasted de-fatted cacao residue, said residue having been added in an amount of less than 2%.

3. A process of stabilizing a glyceride oil composition which comprises adding thereto and dispersing therein a small amount, less than 5%, of a finely divided roasted de-fatted cacao residue.

4. Substantially stabilized glyceride oil containing food composition carrying a relatively small proportion of a cacao material selected from the group consisting of a finely divided substantially fat free cacao residue and its water and alcohol soluble extracts.

5. A substantially stabilized glyceride oil composition having incorporated therein a relatively small proportion of the extract of a finely divided roasted de-fatted cacao residue, said extract being obtained by the use of a solvent having the formula XOH where X is one of the group consisting of hydrogen and a low molecular weight aliphatic group.

6. A substantially stabilized glyceride oil containing food composition having incorporated therein a relatively small proportion, less than 2%, of an alcohol soluble extract of finely divided substantially fat free cacao residue.

7. A substantially stabilized glyceride oil containing composition having incorporated therein a relatively small proportion, less than 2%, of a water soluble extract of finely divided de-fatted cacao residue, dried upon a carrier.

8. A substantially stabilized glyceride oil containing composition having incorporated therein a relatively small proportion, less than 2%, of the alcohol soluble extract of finely divided de-fatted cacao residue, dried upon a carrier.

SIDNEY MUSHER.